United States Patent Office 2,952,505
Patented Sept. 13, 1960

2,952,505
PROCESS FOR DYEING SHAPED ARTICLES

Walter C. Carter and Edgar D. Smith, Decatur, Ala., assignors to The Chemstrand Corporation, Decatur, Ala., a corporation of Delaware No Drawing. Filed Oct. 14, 1953, Ser. No. 386,107

8 Claims. (Cl. 8—21)

This invention relates to a process of pretreating certain acrylic fibers, and more particularly it relates to a method for treating fibers containing acrylonitrile and certain basic monomers in polymeric form with acids to improve their affinity for anionic substances such as dyes, dye intermediates, and surface active agents, and in particular acid and direct dyestuffs.

It is well known that polyacrylonitrile and copolymers of acrylonitrile and other mono-olefinic polymerizable monomers are excellent fiber-forming materials. The polyacrylonitrile and copolymers of more than 80 percent acrylonitrile and up to 20 percent of other polymerizable monomers produce fibers with superior tensile properties, desirable elongation, and excellent stability under a wide range of physical and chemical conditions. However, these polymers are subject to inherent disabilities which greatly restrict their utility in the fabrication of general purpose fibers. For example, the fibers do not have sufficient dye affinity to enable the development of satisfactory colored fibers, and the limited range of colors produced by conventional dyeing techniques are not stable to laundering and dry-cleaning procedures.

The dye-receptivity of acrylonitrile polymers has been greatly improved by utilizing as the comonomer certain basic compounds, particularly heterocyclic compounds containing a tertiary nitrogen in the ring and substituted with a polymerizable alkenyl group. For example, Arnold U.S. Patent No. 2,491,471 describes copolymers containing from 2 to 10 percent recurring vinylpyridine units, the remainder of the copolymer consisting of acrylonitrile units. In copending application, Serial No. 214,231, filed March 6, 1951, by Julian Keith Lawson, there are described and claimed copolymers of from 80 to 98 percent by weight of acrylonitrile and from 2 to 20 percent of a vinylimidazole. Still further improvements in dye-receptivity and other properties of acrylonitrile fibers have been effected by blending polymers or copolymers of acrylonitrile containing at least 80 percent of acrylonitrile in polymeric form with a second copolymer containing at least 30 percent of a basic monomer which is preferably a heterocyclic compound containing a tertiary nitrogen atom in the ring and a polymerizable alkenyl group substituted thereon. As an example of blends of this type reference is made to U.S. Patent No. 2,603,621, wherein are described and claimed blends of fiber forming acrylonitrile polymers with polymers containing N-vinylimidazole as the basic monomer. These blends may have as the principal polymer from 70 to 98 percent of a copolymer of 80 or more percent acrylonitrile and minor proportions of monomers copolymerizable therewith. The other blend constituent is a polymer of 30 or more percent of the basic monomer and up to 70 percent of another copolymerizable monomer. The two components of the blended copolymers are proportioned so as to provide from 2 to 10 percent of the basic monomer in polymerized form in the final blend. Suitable basic monomers are the unsaturated imidazoles, benzimidazoles, imidazolines, oxazoles, benzoxazoles, benzothiazoles, pyridazines, pyrimidines, pyrazines, pyrazoles, pyrroles, triazines, quinolines, pyridines, thiazoles, and lactams. Suitable examples of monomers of the above enumerated types are given in U.S. Patent No. 2,643,990. Preferred basic monomers are the unsaturated pyridines and the unsaturated imidazoles. Aliphatic monomers containing a tertiary nitrogen atom can also be used as the basic monomer, for example the acrylamides described in U.S. Patent No. 2,649,438.

The monomers for copolymerization with acrylonitrile to form the fiber-forming polymers, and for copolymerization with the basic monomer to form the dye-receptive polymers, are not a critical feature of this invention and, therefore, can be any of the well known monomers which are copolymerizable with acrylonitrile or the basic monomer. Among the useful monomers for copolymerization with acrylonitrile to form the fiber-forming polymers may be mentioned vinyl acetate and other vinyl esters of monocarboxylic acids having up to four carbon atoms, methyl methacrylate, and other alkyl methacrylates having up to four carbon atoms in the alkyl radical, methyl acrylate and other alkyl acrylates having up to four carbon atoms in the alkyl group, dimethylfumarate and other dialkyl fumarates having up to four carbon atoms in the alkyl groups, dimethyl maleate and other dialkyl maleates having up to four carbon atoms in the alkyl groups, styrene, α-methylstyrene, and other vinyl or isopropenyl substituted aromatic hydrocarbons, vinyl chloroacetate and other vinyl esters of halo substituted acetic acids, vinylidene chloride, vinyl chloride, and methacrylonitrile. Useful monomers for polymerization with the basic monomer are styrene, α-methylstyrene, vinyl chloride, vinylidene chloride, vinyl acetate, acrylonitrile, methacrylonitrile, acrylic acid, methacrylic acid, the alkyl acrylates, the alkyl methacrylates, vinyl ethers, alkyl crotonates, the alkyl maleates, the alkyl fumarates, butadiene, isoprene, and chloroprene. Since the copolymers of the basic monomers with acrylonitrile have good thermal stability and solvent resistance, these copolymers are usually preferred.

The present invention is concerned with improving the dyeing properties of both blends and copolymers which are comprised of from 2 to 10 percent of an N-heterocyclic monomer of the types described above and at least 80 percent of acrylonitrile, both in polymeric form, and for brevity throughout the remainder of this specification and the appended claims the terms "polymeric fibers containing at least 80 percent by weight of acrylonitrile in polymeric form and from 2 to 10 percent of an N-heterocyclic monomer in polymeric form" will be used to desinate generically fibers made from any of the copolymers or blends mentioned above.

Although as previously mentioned, incorporation of the dye-receptive monomers has enabled the production of fibers having greatly improved dye-receptivity, particularly as regards acid type dyestuffs, it has nevertheless been necessary that the dyebath utilized contain some strong acid, usually at least as much acid percentagewise as dyestuff. The necessity for adding strong acid has not been particularly serious when these acrylic fibers containing the basic nitrogen have been dyed alone, but has presented serious problems when it is proposed to dye yarns or fabrics comprising a blend of hydrophilic type fibers with the acrylic fibers. With wool blends, the problem has been chiefly to raise the relative affinity of the acrylic fibers so that good unions could be achieved. For most acid dyes wool has a greater affinity than even the modified acrylic fibers contemplated by this invention, so that union dyeing, especially in the medium and heavy shades, has not been practical.

An even more serious problem has existed in connection with attempts to union dye yarns or fabrics containing the above described acrylic fibers and cellulose base hydrophilic type fibers such as cotton and viscose rayon. The strong acid, which is necessary in the dyebath to effect acid dyeing of the acrylic fibers, causes an acid-tendering of the cellulosic fibers, and in some instances causes severe degradation of the fibers through hydrolysis.

Even in those instances where the particular acrylic fibers are dyed alone, that is, not blended with hydrophilic fibers, the necessity for using a strong acid in the dyebath has seriously hampered the development of these fibers to the fullest possible extent. One reason for this has been the reluctance on the part of dyers to add corrosive acids to dyebaths due to the possibility of damage of dyeing equipment by the acid.

It is, accordingly, the primary object of this invention to provide a method whereby fibers of polymeric materials containing at least 80 percent by weight of acrylonitrile in polymeric form and from 2 to 10 percent of an N-heterocyclic monomer in polymeric form can be dyed with acid or direct type dyestuffs without the necessity of adding strong acids to the dyebath. Another object of this invention is to provide a method for dyeing yarns comprising a blend of a hydrophilic type fiber with particular acrylic fibers without the disadvantage of causing damage to the hydrophilic fibers or without appreciably increasing the affinity for acid dyestuffs of the hydrophilic fibers. Still another object of this invention is to provide a method for union dyeing of yarns comprising a blend of hydrophlic type fibers with particular acrylic type fibers. Still another object is to provide a method for cross-dyeing of yarns of such composition. Other objects of the invention will become apparent from the description hereinafter.

The objects of the invention are accomplished in general by treating filaments or fibers, comprising polymerized acrylonitrile and a polymerized basic monomer, either in the form of blends with hydrophilic fibers or alone, for from 10 to 30 minutes with an aqueous acid solution of from 0.01 to 1.0 percent concentration at temperatures between 160° F. and 212° F. The fibers, or fabric, are then rinsed with water to remove excess acid, after which the acrylic fiber will be found to dye readily with an acid or direct dye applied from a neutral dyebath.

The pretreatment of the acrylic fibers in accordance with this invention can be carried out at any point between the actual preparation of the fibers and the addition of the fibers to the dyebath. For example, the tow of the polymeric material, during the actual spinning operation, can be passed through an acid bath to effect the necessary treatment. Likewise, the fibers can be treated before or after formation of yarns or fabrics therefrom, and it is immaterial whether or not the hydrophilic type fibers are present during this pretreatment.

The treating time varies inversely with the concentration and strength of the acid and the choice of time, temperature, and concentration of acid is influenced principally by the depth of shade desired and the other fibers present, if any. For example, medium shades may be obtained by pretreating with stronger acids, such as sulfuric acid, of 0.1% concentration for a period of 15 minutes at temperatures of 190° to 200° F. Dark shades may be obtained with strong acids, such as sulfuric, of 0.25% concentration, while light shades only require pretreatment with 0.01% concentration.

When acids other than sulfuric are used, the choice of concentration, time and temperature of treatment will depend upon their acid strength as evidenced by their respective dissociation constants. With cellulosic fiber blends, it is sometimes desirable to carry out the pretreatment with a relatively weak organic acid, such as diglycolic acid, or formic acid, to reduce the danger of acid tendering of the cellulosic fibers. In such a case, acid concentrations up to 1.0 percent may be required, since the effectiveness of acid pretreatments are primarily dependent upon pH of the pretreatment bath.

Suitable acids for use in the pretreatment process of this invention include those acids, both organic and inorganic, having dissociation constants (K at 25° C.) of about $1.76 \times 10^{-4}$ or greater. As examples of suitable acids there may be mentioned sulfuric acid, nitric acid, hydrochloric acid, phosphoric acid, formic acid, dichloroacetic acid, iodic acid, maleic acid, oxalic acid, diglycolic acid, pyrophosphoric acid, sulfurous acid and trichloroacetic acid. Pretreatment with acetic acid ($K=1.75 \times 10^{-5}$) under the conditions of this invention fails to increase the dye affinity of the acrylic-basic fibers to any appreciable extent.

Optimum results are obtained at temperatures near the boiling point, but equivalent results are obtained at lower temperatures provided additional time is allowed for penetration of acid into the fibers. If desired, a suitable wetting or penetrating agent may be employed to expedite penetration of acid. Upon completion of the acid treatment the treated material is rinsed thoroughly to free the material of unadsorbed acid.

Fibers prepared from acrylonitrile-basic polymeric materials treated in accordance with this invention are directly dyed with acid or direct dyestuffs from a neutral dyebath. Preferably, the treated material is placed in a cold neutral dyebath, with or without the usual dyeing assistants, and the temperature raised gradually to 200°–212° F. Satisfactory dye exhaustion can thus be achieved, with no further additions, in about 30 minutes time at the boil. In blended fabrics with wool which have been treated as heretofore described, the relative affinity of the acrylic fiber will be found to be considerably increased so that a wider range of union shades may be obtained in a single dyebath. Union dyeing of the treated acrylic fibers and cellulosic fibers may be accomplished by dyeing both the acrylic fibers and the cellulosic fibers simultaneously with selected direct dyes. Alternatively, these unions may be obtained by first exhausing acid dyes on the acrylic-basic fibers from a neutral dyebath as described, and then dyeing the cellulosic fibers in accordance with usual procedures. If it is desired to effect the dyeing in a single dyebath, it is generally desirable to neutralize this bath after exhaustion of acid dye on the acrylic fibers and before addition of direct dyestuff to this bath. This prevents staining of the acrylic by direct dye and also prevents precipitation of the direct dye which sometimes occurs in an acid bath.

While the mechanism of the acid pretreatment in accordance with this invention it is not completely understood and it is not intended to restrict the invention to any theoretical explanation thereof, it is believed that some of the tertiary nitrogen atoms present in the polymeric material are first neutralized by the acid.

(1) 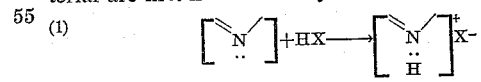

In the dyebath the dye anion exchanges with the anion of the acid.

(2) 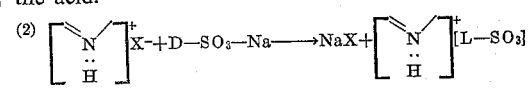

The function of the strong acid in the dyebath, when untreated fibers are to be dyed, is to convert the dyestuff into the acid form so that the dye anion can attach to the cationic portion of the polymer.

(3)          D—SO$_3$Na+HX⟶DSO$_3$H+NaX (4) 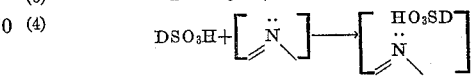

By neutralizing the tertiary nitrogen by pretreatment with acid, the necessity for the use of strong acid in the dyebath is thus obviated or minimized.

Infrared examination of fibers pretreated in accordance with the process of this invention reveals no sign of hydrolysis or other chemical change in structure of the polymeric material, thus substantiating the theory that the improvements result from the residual acid remaining in the fibers. The theory is further supported by the results of tests wherein partially hydrolyzed polyacrylonitrile was blended with a copolymer containing 50 percent by weight of acrylonitrile and 50 percent of 2-methyl-5-vinylpyridine, to give an over-all methylvinylpyridine content of 6 percent. Fibers prepared from this blend did not show the same degree of dyeability as fibers prepared from the same blend except that the polyacrylonitrile was not partially hydrolyzed. It has also been demonstrated that the dye affinity of fibers treated in accordance with the process of this invention can be reduced to that of identical untreated fibers by washing with water and/or dilute alkali at the boil for a sufficient period of time to remove the residual acid.

In addition to the advantages already enumerated, the pretreatment method of this invention makes it possible to obtain much deeper shades when dyeing acrylonitrile-basic polymeric fibers and also gives increased wash fastness to such materials.

The following specific examples, which illustrate but do not limit the invention and in which parts, proportions, and percentages are by weight unless otherwise specified, illustrate preferred modes of operating in accordance with the principles of this invention.

*Example I*

A series of knitted samples were prepared from fibers obtained by wet spinning a blend of a copolymer containing 94 percent by weight of acrylonitrile and 6 percent of vinyl acetate and a second copolymer containing 50 percent acrylonitrile by weight and 50 percent of 2-methyl-5-vinylpyridine, the blend being so proportioned that 6 percent by weight of the total blend was 2-methyl-5-vinylpyridine. Samples of these knittings were treated at the boil for 30 minutes with sulfuric acid solutions varying from 0.01 to 0.10 percent concentrations. One-hundred parts of acid solution was used for one part of knitted material. The treated samples were then thoroughly rinsed with water and dyed at the boil with 2.0 percent (based on total fiber weight) Calcocid Alizarine Blue SAPX (Color Index No. 1054) for one and one-half hours. Sixty parts of the dyebath was used for one part of knitted material. No acid was added to the dye-baths. The dyebaths were practically completely exhausted for all the samples pretreated and deep, even coloring was obtained.

*Example II*

The procedure of Example I was repeated using formic acid, diglycolic acid, phosphoric acid, hydrochloric acid and nitric acid. With the weaker acids, e.g. formic, optimum dyeing results were obtained only by pretreatment with concentrations approaching 1.0%, whereas samples were dyed to fairly deep shades after pretreatment with stronger acids, e.g. nitric, at concentrations as low as 0.01 percent.

*Example III*

A knitted sample containing 50% wool and 50% acrylic fibers of the composition described in Example I was entered into a 40:1 bath of 0.1% sulfuric acid at 190–200° F. After running in this bath for 15 minutes, the bath was overflowed and the sample rinsed well.

A 40:1 dyebath was made up to contain the following (all percentages based on the total fiber weight):

2.0% Calcocid Alizarine Blue SAPX
4.0% sulfuric acid
5.0% Glauber's salt

The dyebath was heated to 120° F. and the pretreated sample then entered. The temperature was raised gradually to 205° F. over a period of 20–30 minutes. The dyeing was then run at this temperature for an additional 30 minutes. Practically complete exhaustion and uniform coverage of both fibers was obtained.

*Example IV*

A blend of fibers containing 50% viscose rayon and 50% acrylic fibers of the composition described in Example I was treated in a 40:1 bath of 0.1% sulfuric acid and 0.025% anionic detergent at 200° F. for 15 minutes. The sample was then removed and rinsed well with water.

The treated material was placed in a 40:1 dyebath containing 4.0% Acid Black G and 0.5% Brilliant Croceine Scarlet MOO (percentages based on total fiber weight), at 120° F. and the bath was raised to the boil in 15 minutes. After 30 minutes at the boil the bath was cooled to 120° F. and the pH adjusted to 5.0 with $NaHCO_3$. At this point the acrylic fibers had been dyed black and had substantially exhausted the acid dyes from the bath.

There was then added 5.0% Cuprohenyl Black RL (based on total fiber weight) to the dyebath, the temperature raised to 160° F. in about 15 minutes, and 20% NaCl added. After boiling for an additional 15 minutes, 20% NaCl was again added (based on total fiber weight), and boiling continued for 15–30 minutes to complete exhaustion of the direct dye. The material was then rinsed and after-treated with 3% $CuSO_4$ and 1.0% formic acid (percentages based on fiber weight) for 15 minutes at 160° F. Scouring was effected with 1% anionic detergent and 0.5% tetra sodium pyrophosphate at 160° F. for 15 minutes, followed by rinsing.

This procedure gave close union dyeing of the acrylic fibers and the viscose fibers, and the dyed material had quite satisfactory fastness properties. Similar union dyeings have been made even more readily in medium shades with the non-after-treatment direct dyes, using acid dyes for the acrylic fibers.

This invention is not to be limited to the use of the particular acid and direct dyestuffs shown in the specific examples. The acid and direct type dyestuffs are well-recognized classes of dyes and the invention is directed to the dyes as a class.

The polymeric materials utilized in the process of this invention may be produced by any of the known polymerization procedures, and the filaments, fibers or yarns may be produced by either the wet, dry, or melt-spinning techniques.

We claim:

1. A process for dyeing shaped articles composed of fibers formed from polymeric materials containing in the polymer molecule at least 80 percent by weight of acrylonitrile and from 2 to 10 percent of a polymerizable N-heterocyclic monomer and hydrophilic fibers selected from the group consisting of wool, cotton, and regenerated cellulose, which comprises treating said fibers with an aqueous solution containing only 0.01 to 1.0 percent of an acid having a dissociation constant greater than $1.76 \times 10^{-4}$ at a temperature in the range of 160° F. to 212° F. for a period of 10 to 30 minutes, thereafter washing the article free of excess acid solution, and dyeing the article with dyestuffs selected from the group consisting of acid dyestuffs and direct dyestuffs.

2. The process as defined in claim 1 wherein the hydrophilic fibers are wool and the dyestuff is an acid dyestuff.

3. The process as defined in claim 1 wherein the hydrophilic fibers are cotton and the dyestuff is a direct dyestuff.

4. The process as defined in claim 1 wherein the hydrophilic fibers are regenerated cellulose and the dyestuff is a direct dyestuff.

5. The process for dyeing shaped articles composed of fibers formed from polymeric materials containing in the polymer molecule at least 80 percent by weight of acrylonitrile and from 2 to 10 percent of a polymerizable N-heterocyclic monomer and cotton fibers, which comprises treating said fibers with an aqueous solution containing only 0.01 to 1.0 percent of an acid having a dissociation constant greater than $1.76 \times 10^{-4}$ at a temperature in the range of 160° F. to 212° F. for a period of 10 to 30 minutes, thereafter washing the article free of excess acid solution, dyeing the fibers formed from said polymeric materials with an acid dyestuff and dyeing the said cotton fibers with a direct dyestuff.

6. The process for dyeing shaped articles composed of fibers formed from polymeric materials containing in the polymer molecule at least 80 percent by weight of acrylonitrile and from 2 to 10 percent of a polymerizable N-heterocyclic monomer and regenerated cellulose fibers, which comprises treating said fibers with an aqueous solution containing only 0.1 to 1.0 percent of an acid having a dissociation constant greater than $1.76 \times 10^{-4}$ at a temperature in the range of 160° F. to 212° F. for a period of 10 to 30 minutes, thereafter washing the article free of excess acid solution, dyeing the fibers formed from said polymeric materials with an acid dyestuff and dyeing the said regenerated cellulose fibers with a direct dyestuff.

7. A process for dyeing shaped articles composed of fibers formed from polymeric materials containing in the polymer molecule at least 80 percent by weight of acrylonitrile and from 2 to 10 percent of a polymerizable N-heterocyclic monomer and hydrophilic fibers selected from the group consisting of wool, cotton, and regenerated cellulose, which comprises treating said fibers with an aqueous solution containing only 0.01 to 0.25 percent of sulfuric acid at a temperature in the range of 160° F. to 212° F. for a period of 10 to 30 minutes, thereafter washing the articles free of excess sulfuric acid solution, and dyeing the article with dyestuffs selected from the group consisting of acid dyestuffs and direct dyestuffs.

8. A process for dyeing shaped articles composed of fibers formed from a blend of a copolymer containing 94 percent by weight of acrylonitrile and 6 percent by weight of vinyl acetate and a second copolymer containing 50 percent by weight of acrylonitrile and 50 percent by weight of 2-methyl-5-vinylpyridine, the blend being so proportioned that from 2 to 10 percent by weight of the total blend is 2-methyl-5-vinylpyridine in polymeric form and hydrophilic fibers selected from the group consisting of wool, cotton, and regenerated cellulose, which comprises treating said fibers with an aqueous solution containing only 0.01 to 1.0 percent of an acid having a dissociation constant greater than $1.76 \times 10^{-4}$ at a temperature in the range of 160° F. to 212° F. for a period of 10 to 30 minutes, thereafter washing the article free of excess acid solution, and dyeing the article with dyestuffs selected from the group consisting of acid dyestuffs and direct dyestuffs.

References Cited in the file of this patent

UNITED STATES PATENTS

| | | |
|---|---|---|
| 2,356,767 | Kropa | Aug. 29, 1944 |
| 2,548,853 | Baker | Apr. 17, 1951 |
| 2,613,194 | Craig | Oct. 7, 1952 |
| 2,750,250 | Lindenstruth | June 12, 1956 |

FOREIGN PATENTS

| | | |
|---|---|---|
| 905,038 | France | Mar. 26, 1945 |
| 918,532 | France | Oct. 28, 1946 |
| 682,694 | Great Britain | Nov. 12, 1952 |

OTHER REFERENCES

"This Is Orlon Acrylic Fiber," pamphlet published by Du Pont, Wilmington, Del., November 1948, page 13, Graph II.

Am. Dyestuff Rep., March 17, 1952, pp. 161, 162.
Am. Dyestuff Rep., September 17, 1951, p. P600.

UNITED STATES PATENT OFFICE
CERTIFICATE OF CORRECTION

Patent No. 2,952,505                        September 13, 1960

Walter C. Carter et al.

It is hereby certified that error appears in the printed specification of the above numbered patent requiring correction and that the said Letters Patent should read as corrected below.

Column 2, line 50, for "desinate" read -- designate --; column 4, lines 60 to 63, formula (2) should appear as shown below instead of as in the patent:

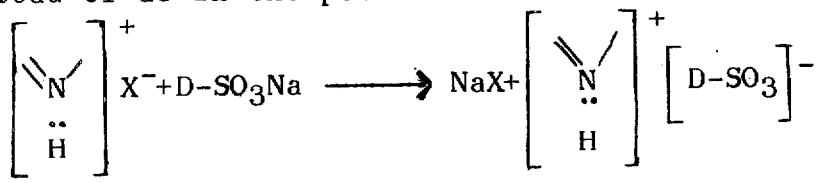

column 7, line 16, for "0.1" read -- 0.01 --.

Signed and sealed this 18th day of April 1961.

(SEAL)
Attest:

ERNEST W. SWIDER
Attesting Officer

DAVID L. LADD
Commissioner of Patents